United States Patent [19]

Weckenmann

[11] 4,013,986
[45] Mar. 22, 1977

[54] INDUCTIVE TRANSDUCER FOR RECTILINEAR OR ROTATIONAL DISPLACEMENT

[75] Inventor: Albert Weckenmann, Oberasbach-Altenberg, Germany

[73] Assignee: Robert Bosch G.m.b.H., Stuttgart, Germany

[22] Filed: July 23, 1974

[21] Appl. No.: 491,180

[30] Foreign Application Priority Data

Oct. 22, 1973 Germany .......................... 2352851

[52] U.S. Cl. .................................. 336/75; 336/79
[51] Int. Cl.² ....................................... H01F 21/04
[58] Field of Search ............... 336/73, 75, 77, 79, 336/87; 323/50, 85, 87

[56] References Cited

UNITED STATES PATENTS

| 1,642,343 | 9/1927 | Raimondi | 336/77 X |
|---|---|---|---|
| 1,828,900 | 10/1931 | Kouyoumjian | 336/77 X |
| 2,020,796 | 11/1935 | Norris | 336/75 |
| 2,030,606 | 2/1936 | Norris | 336/75 |
| 2,697,214 | 12/1954 | Smith | 336/75 X |
| 2,922,146 | 1/1960 | Smith et al. | 336/75 X |
| 3,173,119 | 3/1965 | Thompson | 336/75 X |
| 3,215,962 | 11/1965 | Thompson | 336/79 X |
| 3,495,456 | 2/1970 | Ohno | 336/75 X |

FOREIGN PATENTS OR APPLICATIONS

| 396,408 | 8/1933 | United Kingdom | 336/77 |
| 647,859 | 10/1962 | Italy | 336/77 |

*Primary Examiner*—Thomas J. Kozma
*Attorney, Agent, or Firm*—William R. Woodward

[57] ABSTRACT

The inductance of a coil wound on one end of an elongated rectangular core with an elongated central window is caused to vary by the displacement of a conducting plate or ring arrangement lengthwise of the core. The other end of the core may also be wound with a coil to produce a differential type of transducer. The elongated core may be bent around into a circle in order to provide a transducer for rotational displacement. Additional ferromagnetic bodies in fixed relation to the core or to the short-circuiting rings can be used to modify the translation characteristic.

3 Claims, 12 Drawing Figures

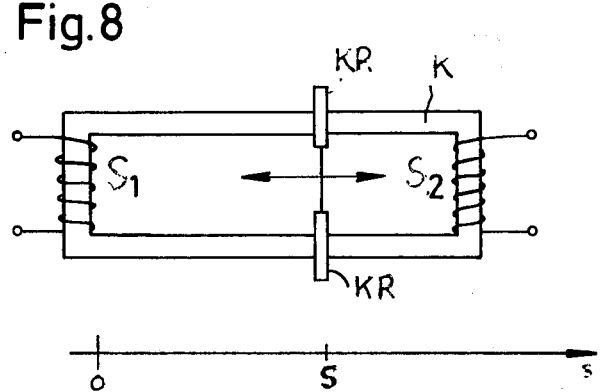
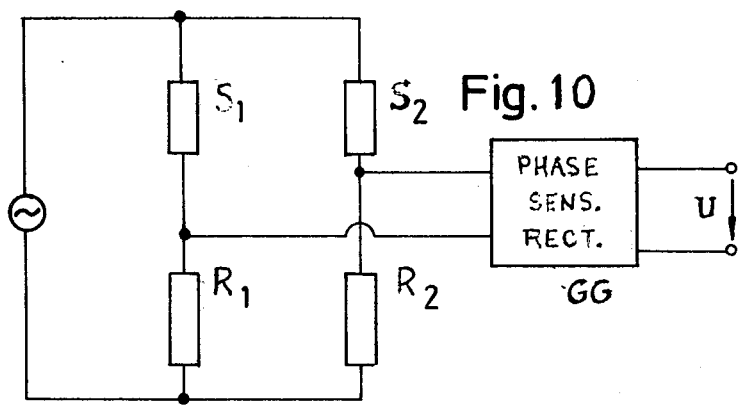
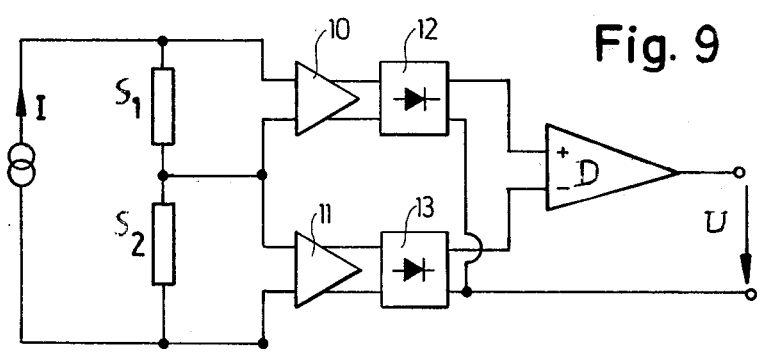

INDUCTIVE TRANSDUCER FOR RECTILINEAR OR ROTATIONAL DISPLACEMENT

This invention relates to a transducer for converting a mechanical displacement into an analog electrical output magnitude, preferably an electrical voltage, which varies as a function of the displacement of a body whose displacement is to be measured, preferably in a linear relation to that displacement.

The known transducers for converting a mechanical displacement into an electrical voltage are resistance transducers, inductive transducers, the insertable-armature type of transformer transducers, as well as their respective differential configurations, and transformer transducers utilizing a short-circuiting ring.

The insertable-armature transducers have an unsatisfactory linearity for long paths of travel (from about 5 cm up), exert a force upon the body to be measured that is not negligible and their mechanical length dimension is substantially greater than — at least twice as great — the usable electric stroke, so that the physical embodiment requires considerable space.

The resistor transducer suffers wear as the result of the unavoidable friction contact and, moreover, when displacement occurs, frictional forces must be overcome. The transformer transducer utilizing a short-circuiting ring requires a uniformly wound and longitudinally extensive primary winding, as well as, in addition, a secondary winding.

It is an object of the present invention to provide a transducer for displacement which is not subject to wear, exerts a minimum force on the object of which the displacement is to be measured and which has a physical length only slightly greater (less than 60% greater) than the usable electrical stroke and which, furthermore, requires only a single coil.

SUBJECT MATTER OF THE PRESENT INVENTION

Briefly, a coil winding is provided on a portion of an elongated rectangular slotted core and short-circuiting ring means passing through the core slot and displaceable in the long dimension of the rectangular core and means for displacing the ring means in the long dimensional core are provided, such that the inductance of the coil depends upon the position of the ring means along the long dimension of the core. The short-circuiting ring means is displaceable along the long dimension of the core substantially without contact therewith. The core may be solid or made of sheet metal laminations, and may be of open or closed-slot configuration. The short-circuiting ring means may be a single or double short-circuiting ring or a similar short-circuited coil or a short-circuiting plate or a single or double short-circuiting loop, in each case movable without contact with the core along the longitudinal direction of the core. The term "rectangular" describing the configuration of the elongated core is used in a sense which includes a configuration in which the long sides of the rectangle are bent, for example in concentric arcs of a circle, whether at the same radius or different radii, in which case the path of the short-circuiting ring means may be such as may be described by ring means that are mounted on an arm swinging on an axis about which it is desired to measure angular displacement in rotary movement.

If the window or slot in the center of the core is not provided with rectangular configuration but rather with some other shape, the translation characteristic of the transducer, i.e. the dependence of the inductance of the coil upon the position of the short-circuiting ring, can be influenced. Similarly, the translation characteristic or function can be modified by other modifications in the core shape, including the outer contour of the core.

Two identical coils can be so provided on different portions of the core that the displacement of the short-circuiting ring increases the inductance of one coil and reduces the inductance of the other by the same amount, with the result that a differential transducer may be provided in accordance with the invention having, in addition to the advantage of the doubled sensitivity, also an improvement in linearity. The evaluation or processing of the output of the differential arrangement can be accomplished with two separate circuits followed by determining the difference as the last step, or it can be accomplished by means of a bridge circuit and a controlled or synchronous rectifier.

If as mentioned above the form of core bent into a circle is selected in such a way that one of the long legs of the core has a smaller radius than the other and the yokes or end members of the core are radially disposed, an angle-of-rotation transducer can be built which can be used over a sector of almost 360°. This objective can also be obtained by modifying the shape of the core so that the two long legs of the core have the same radius and the yoke or end members are disposed parallel to the axis of curvature of the curved legs.

The invention is further described by way of example with reference to the accompanying figures, in which:

FIG. 8 is a diagrammatic representation of a differential transducer according to the invention;

FIG. 9 is a diagram of a circuit for processing the output of a differential transducer according to the invention;

FIG. 10 is another form of the processing circuit for the output of a differential transducer according to the invention;

Figure 1:
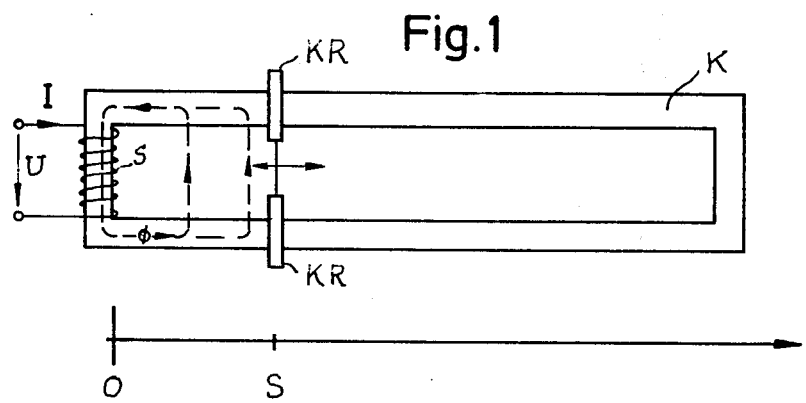
FIG. 1 is a diagrammatic representation of a transducer according to the invention, utilizing a pair of individual short-circuiting rings.

The device shown diagrammatically in FIG. 1 operates as the result of the production of an alternating magnetic flux Φ by an alternating current I passing through the coil S. The weighed form of the alternating current I is preferably either sinusoidal or square. The flux Φ completes its path through the legs of the core and through the air space between the core legs. It cannot pass through the portion of the core legs beyond the short-circuiting rings KR or through the core yoke at the end of the core legs opposite the coil S, because the short-circuiting rings present what is practically an infinitely great magnetic resistance, since $d\Psi/dt$ must vanish within the short-circuited winding. If the air window provided by the core aperture is very narrow and if the permeability of the iron core K is high enough, the value of magnetic conductivity of the air window between the coil S and the short-circuiting rings KR across which the magnetic flux Φ must complete its path depends linearly on the position of the short-circuiting rings along the core. In principle the termination of the core — i.e. the end opposite the soil S — is not of interest, so that the core could also be open at that end. Since the inductance L of the coil S is proportional to the magnetic conductivity for the flux Φ, L depends linearly on the location of the short-circuiting rings along the core, designated by the dimension $s$. Assuming for example a sinusoidal current I of angular frequency ω is impressed upon the coil (where $\omega = 2\pi f$), the voltage across the coil, in terms of the location of the short-circuiting rings will be given by the expression:

$$U = I \cdot \omega \cdot L(s) = ks$$

Figure 2:
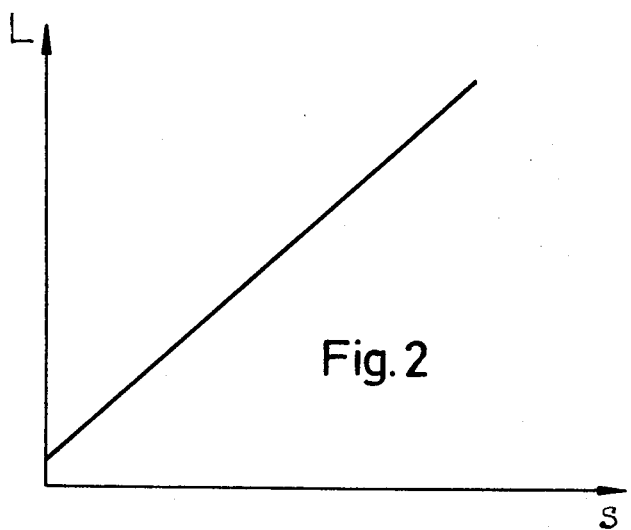
FIG. 2 is a graph on which is plotted the translation characteristic of the transducer, i.e. the dependence of the inductance L upon the position s of the short-circuiting rings.

As the result of the unavoidable stray field magnetic conductivity, the inductance L is greater than 0 when the short-circuiting rings stand at $s = 0$. The dependence of L as a function of $s$, which may be denoted $L(s)$, is shown in FIG. 2. The force exerted by the magnetic field on the short-circuiting rings in the lengthwise direction of the core is negligibly small, since at the location of the short-circuiting rings, in which a current flows, the magnetic field drops to practically 0.

Figure 3:
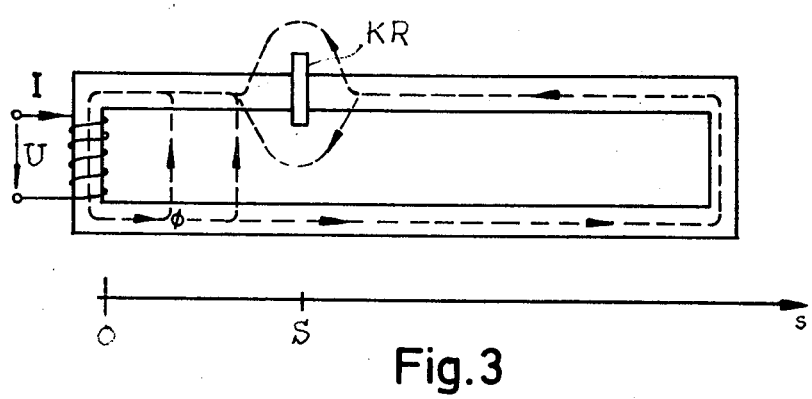
FIG. 3 is a diagrammatic representation of an inductive transducer utilizing a single short-circuiting ring.

In FIG. 3 a transducer is shown having only a single short-circuiting ring. As the result of the conductor resistance which is not to be neglected in any case, the single short-circuiting ring presents less resistance than the pair of short-circuiting rings shown in FIG. 1 and, moreover, the magnetic conductivity for the stray flux around the short-circuiting ring must be given greater consideration in the arrangement of FIG. 3. In consequence, the translation characteristic of a transducer with a single short-circuiting ring can be distinguished from that of a transducer with double short-circuiting rings. The translation characteristic can actually be modified in this way.

Figure 4:
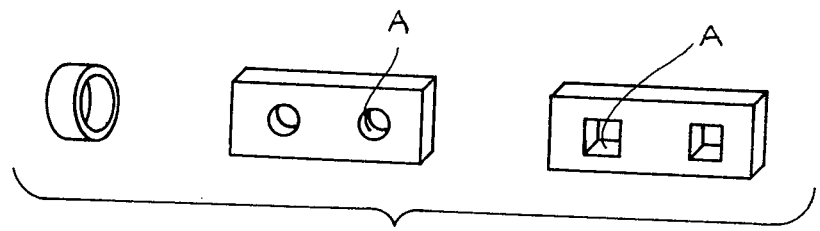
FIG. 4 is a perspective illustration of further possible forms which the short-circuiting ring means may take.

Other possible shapes for the short-circuiting rings are represented in FIG. 4. The center and right-hand illustrations of FIG. 4 show short-circuiting plates of metallic conducting material, preferably of copper, aluminum or silver, having apertures A for accommodating the core legs, a form which is particularly easy to produce. Wound coils can also be used in place of single-turn short-circuiting rings, with the result that in certain cases a higher magnetic resistance can be obtained than in the case of massive short-circuiting rings, because the influence of the skin effect can be held smaller in the case of wound coils. The short-circuiting rings or coils can also be offset relative to each other in the lengthwise direction by $\Delta s$.

Figure 5:
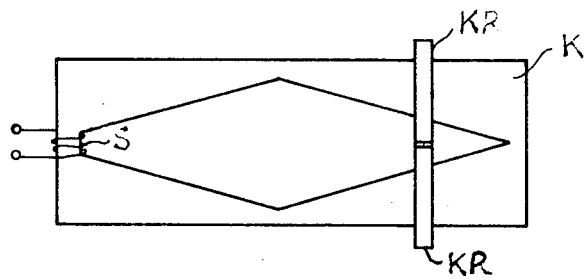
FIG. 5 is a diagrammatic representation of an inductive transducer having a substantially rhombic core aperture.
Figure 6:
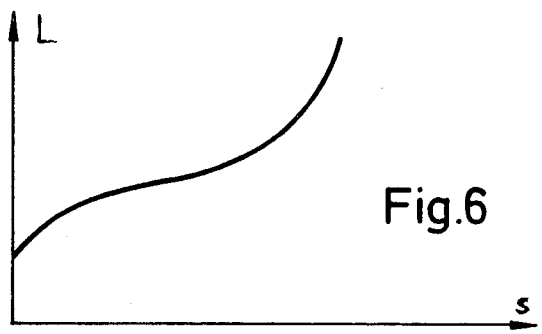
FIG. 6 is a graph of the translation characteristic of the transducer of FIG. 5.

FIG. 5 shows a rectangular core shape with a rhombic window. The value of magnetic conductivity for the path over which the magnetic flux passes, as the result of the rhombic core window, is no longer linear in terms of the position of the short circuit rings along the core, but varies in a different way. The resulting translation characteristic is shown in FIG. 6. The form of core illustrated in FIG. 5 is given merely as an example to show how the course of the translation characteristic can be modified by means of the core shape.

Figure 7:
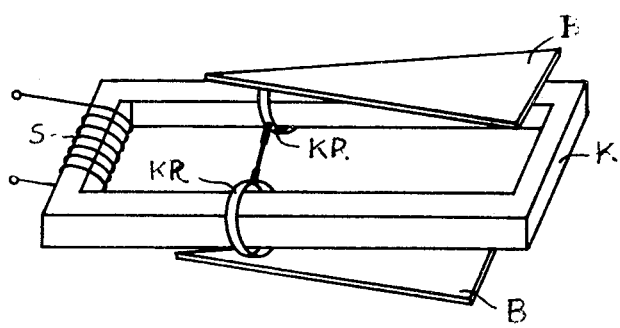
FIG. 7 is a perspective view of a transducer according to the invention equipped with plates of ferromagnetic material disposed parallel to the core for modification of the translation characteristic.

FIG. 7 shows a further possibility for modifying the translation characteristic. A body B of very good magnetic conductivity is disposed parallel to the core in a position outside the path of the short-circuiting ring. Such a body can increase the magnetic stray field conductivity around the short-circuiting rings. If the ferromagnetic body B is moved together with the short-circuiting rings, the characteristic along the entire length of the device will be affected. If the ferromagnetic body is fixed relative to the core, the characteristic will be modified in some locations more than in others, according to the dimensions of the body B.

FIG. 8 shows a differential transducer provided with two identical coils S1 and S2. When the inductance of the coil S1 is increased by a movement of the short-circuiting rings, the inductance of the coil S2 will at the same time be diminished. A circuit for utilizing this differential effect is shown in FIG. 9. The two coils may be connected in series, wound either the same way or in opposite ways with respect to the core (that is, either series aiding or series opposing with respect to flux that might link both coils). The same current I flows through both coils and the voltages appearing across the respective coils are amplified in amplifiers 10 and 11 and then immediately rectified in rectifiers 12 and 13 respectively, after which the difference between ΔU between the rectified voltages is produced by the differential amplifier D. The difference voltage is the output magnitude of the circuit.

Of course instead of the amplifiers followed by rectifiers, an active rectifier with an operational amplifier of known form can be used.

A second example of a circuit for processing the output of a differential transducer is a bridge circuit, such as shown in FIG. 10. The voltage across a diagonal of the bridge is rectified with a phase-sensitive rectifier GG of known form. The coils, again, can be connected in the bridge either in the sense producing additive effects or in the sense producing a bucking effect (windings aiding or windings opposing). The bridge circuit can be operated either with impressed current or with an applied voltage and likewise with an input resistance of any desired value in series with a voltage source.

Figure 11:
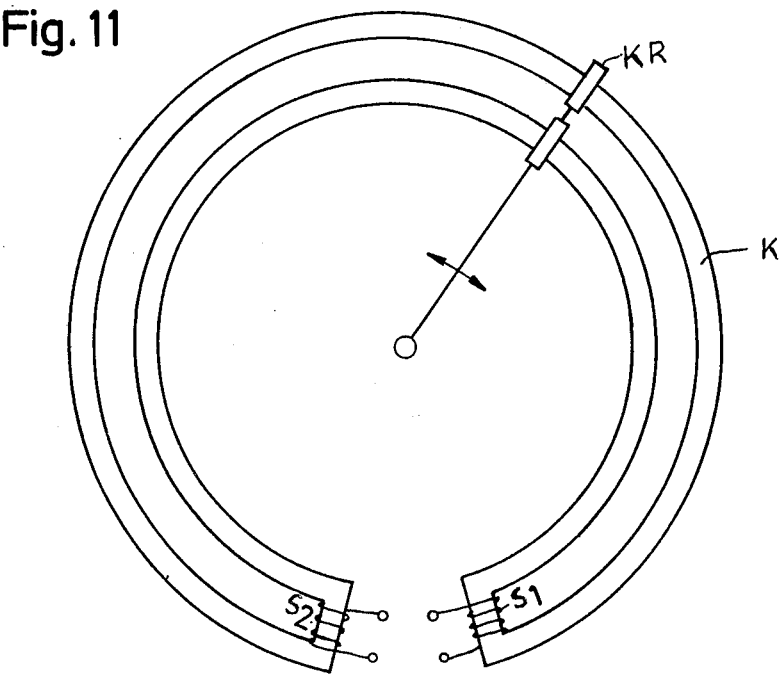
FIG. 11 is a diagrammatic representation of a differential transducer according to the invention for measuring or following angular displacement.

FIG. 11 shows a form of inductive transducer, in this case a differential transducer, for use as an angular position transducer. The core can be bent around in a ring for any desired length of arc. In FIG. 11 the yokes joining the ends of the core legs and carrying the coils are radially disposed and the core legs are concentric and at different average diameters.

Figure 12:
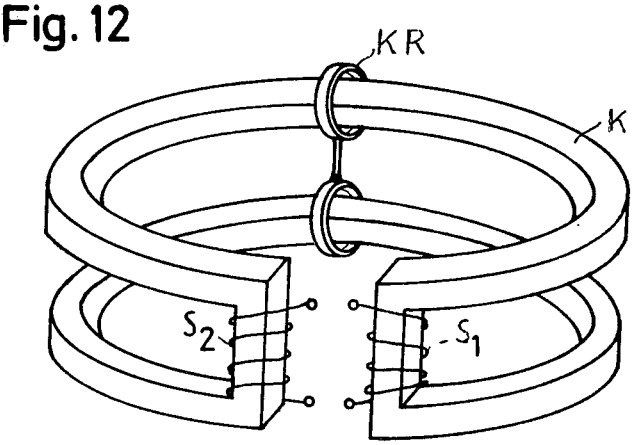
FIG. 12 is a perspective diagrammatic view of another embodiment of the invention for operation with angular displacement.

FIG. 12 shows another form of inductive transducer for use as an angular displacement transducer in which the core legs have the same shape, hence the same average diameter, and the core yokes are axially directed.

Although the invention has been described with respective to particular illustrative embodiments, it will be understood that variations and modifications may be made within the inventive concept.

I claim:

1. A transducer for converting a mechanical displacement into an analog electrical output magnitude in accordance with a predetermined function of the displacement of a body, comprising:

an elongated ferromagnetic core having two elongated members joined at at least one end by a transverse core portion and elsewhere separated by an elongated gap free of intermediate ferromagnetic members;

a coil wound on a transverse end portion of said core; and short-circuiting ring means comprising short circuits respectively encircling individually each of said two elongated members at substantially the same distance from said end portion of said core, mechanically constituted as a single unit, and displaceably mounted for movement in the direction of elongation of said members relative to said core with a conductive part of said ring means always passing completely through said gap and thereby completing said short circuits, for varying the inductance of said coil in response to displacement of said ring means.

2. A transducer as defined in claim 1 in which said two elongated members are joined by transverse core portions respectively at both ends of said members.

3. A transducer as defined in claim 1 in which said short-circuiting ring means is displaceably mounted for movement in the direction of elongation of said members in such a way that said ring means remains substantially without contact with said core during displacement of said ring means.

* * * * *